United States Patent
Baer

(10) Patent No.: US 11,639,165 B2
(45) Date of Patent: May 2, 2023

(54) GEAR ASSEMBLY FOR A GEARED MOTOR OF AN ELECTRICALLY OPERABLE BRAKE, GEARED MOTOR, PARKING BRAKE SYSTEM, AND SERVICE BRAKE SYSTEM

(71) Applicant: ZF Active Safety GmbH, Koblenz (DE)

(72) Inventor: Jan Niklas Baer, Nassau (DE)

(73) Assignee: ZF Active Safety GmbH, Koblenz (DE)

( * ) Notice: Subject to any disclaimer, the term of this patent is extended or adjusted under 35 U.S.C. 154(b) by 220 days.

(21) Appl. No.: 16/957,103

(22) PCT Filed: Dec. 18, 2018

(86) PCT No.: PCT/EP2018/085409
§ 371 (c)(1),
(2) Date: Jun. 22, 2020

(87) PCT Pub. No.: WO2019/121626
PCT Pub. Date: Jun. 27, 2019

(65) Prior Publication Data
US 2021/0380090 A1    Dec. 9, 2021

(30) Foreign Application Priority Data

Dec. 22, 2017   (DE) .......................... 102017131096.7

(51) Int. Cl.
*F16H 1/28*      (2006.01)
*B60T 13/74*     (2006.01)
(Continued)

(52) U.S. Cl.
CPC ............ *B60T 13/741* (2013.01); *F16D 65/18* (2013.01); *F16D 2121/24* (2013.01);
(Continued)

(58) Field of Classification Search
CPC . F16H 1/2845; F16H 1/26; F16H 1/48; B60T 13/741; B60T 13/746; F16D 2125/48; F16D 2125/50
See application file for complete search history.

(56) References Cited

U.S. PATENT DOCUMENTS 3,434,365 A * 3/1969 Quenneville ............. F16H 1/48
74/410
4,173,906 A * 11/1979 Altenbokum ......... F16H 1/2845
475/346
(Continued)

FOREIGN PATENT DOCUMENTS

AT        107213 B       9/1927
CN     107327541 A     11/2017
(Continued)

OTHER PUBLICATIONS

Haberhauer and Bodenstein, Maschinenelemente, 2014, pp. 345-346, Springer Vieweg, Germany.

*Primary Examiner* — Sherry L Estremsky
(74) *Attorney, Agent, or Firm* — Robert James Harwood

(57) ABSTRACT

The gear assembly can be operatively connected on the input side to a drive machine and on the output side preferably to an actuating element of the electrically operable brake and comprises at least one gear stage. The at least one gear stage comprises at least two intermeshing gear wheels, of which at least one gear wheel is rotatably mounted on an axle element by engagement of the axle element in a receptacle of the at least one gear wheel. The receptacle and the axle element have mutually corresponding peripheral surfaces, of which, in the axial direction, at least one peripheral surface has an outwardly curved contour and the other peripheral surface has a contour designed such that the peripheral surfaces roll against one another on the contours in order to
(Continued)

bring the at least one gear wheel and the axle element into an oblique position relative to one another.

18 Claims, 3 Drawing Sheets

(51) Int. Cl.
  *F16D 65/18* (2006.01)
  *F16D 121/24* (2012.01)
  *F16D 125/48* (2012.01)
  *F16H 1/48* (2006.01)
  *F16H 1/26* (2006.01)
(52) U.S. Cl.
  CPC ............ *F16D 2125/48* (2013.01); *F16H 1/26* (2013.01); *F16H 1/2845* (2013.01); *F16H 1/48* (2013.01)

(56) References Cited

U.S. PATENT DOCUMENTS

| | | | | |
|---|---|---|---|---|
| 5,370,014 | A * | 12/1994 | Pigozzi | F16H 37/042 74/606 R |
| 8,313,412 | B2 * | 11/2012 | Montestruc | F16H 1/2836 475/346 |
| 8,790,213 | B1 * | 7/2014 | Isayama | F16C 33/20 475/331 |
| 10,816,087 | B2 * | 10/2020 | Nique | F16H 57/08 |
| 11,085,523 | B2 * | 8/2021 | Nique | F16H 57/0479 |
| 2005/0252328 | A1 * | 11/2005 | Shattuck | F16C 23/08 74/431 |
| 2007/0119664 | A1 | 5/2007 | Perrault et al. | |
| 2014/0245848 | A1 | 9/2014 | Ikeda | |
| 2017/0082157 | A1 * | 3/2017 | Son | F16D 55/226 |
| 2017/0227078 | A1 | 8/2017 | Oshio et al. | |
| 2018/0202517 | A1 * | 7/2018 | Jang | F16D 65/18 |
| 2021/0362700 | A1 * | 11/2021 | Schwarz | F16D 65/18 |

FOREIGN PATENT DOCUMENTS

| | | | | |
|---|---|---|---|---|
| DE | 2235448 | A1 * | 2/1974 | |
| DE | 2339882 | A1 * | 2/1975 | |
| DE | 3425268 | C1 | 5/1985 | |
| DE | 19750920 | A1 | 6/1999 | |
| DE | 10137881 | A1 | 5/2002 | |
| DE | 102010063300 | A1 | 6/2011 | |
| DE | 102015103203 | A1 | 9/2016 | |
| DE | 102016108277 | A1 | 11/2016 | |
| JP | 2016125547 | A | 7/2016 | |
| JP | 2016149877 | A | 8/2016 | |
| WO | WO-2004022394 | A1 * | 3/2004 | ............ B60T 13/741 |
| WO | WO-2011012973 | A1 * | 2/2011 | ............ F16H 48/08 |
| WO | 2012/010256 | A1 | 1/2012 | |

* cited by examiner

GEAR ASSEMBLY FOR A GEARED MOTOR OF AN ELECTRICALLY OPERABLE BRAKE, GEARED MOTOR, PARKING BRAKE SYSTEM, AND SERVICE BRAKE SYSTEM

CROSS-REFERENCE TO RELATED APPLICATION

This application is a national stage of International Application No. PCT/EP2018/085409, filed Dec. 18, 2018, the disclosure of which is incorporated herein by reference in its entirety, and which claimed priority to German Patent Application No. 102017131096.7, filed Dec. 22, 2017, the disclosure of which is incorporated herein by reference in its entirety.

TECHNICAL FIELD

The present disclosure relates to a gear assembly for a geared motor of an electrically operable brake. The present disclosure moreover relates to a geared motor for an electrically operable brake, a parking brake system for a motor vehicle, and a service brake system for a motor vehicle.

BACKGROUND

A gear assembly of the type claimed herein is known from WO 2012/010256 A1. The gear assembly therein forms, together with an electromotor, a geared motor unit which serves to operate an electrically operable brake of a motor vehicle. The gear assembly comprises multiple gear stages within each case at least two intermeshing toothed wheels, at least one of which is rotatably mounted on an axle element. The axle element itself is in turn arranged on a support structure supporting the gear stages.

It has been shown that, in the case of such a gear assembly, the production of noise is promoted during operation. It has been established that the occurrence of noise can be caused by local excess loads which occur during operation in the region in which the intermeshing teeth of the toothed wheels engage. These local excess loads result from the fact that, in the event of high forces which need to be transmitted, deformations can occur on individual components of the gear assembly, such as for example the support structure, as a result of which undesired constraining forces arise which apply a load, for example via the axle elements, to the toothed wheels or the region in which their intermeshing teeth engage. It has been observed, for example, that, in the event of the support structure being deformed, this can promote an inclined position of the axle elements and hence also an inclined position of the respectively associated toothed wheels, and consequently this can cause a relatively unfavorable engagement of the intermeshing teeth of the toothed wheels, as a result of which the excess loads and possibly noise can occur.

SUMMARY

An object of the present disclosure is to propose at least one option for counteracting the production of noise during operation for a gear assembly of the type mentioned at the beginning.

This object is achieved by a gear assembly. In order to achieve the object, a geared motor, a parking brake system, and a service brake system are moreover proposed. Advantageous embodiments and/or designs and/or aspects of the present disclosure can be found in the dependent claims, the description hereinafter, and the drawings.

A basic gear assembly for a geared motor of an electrically operable brake, such as for example a parking brake or a service brake, can be actively connected on the input side to an engine and on the output side to preferably an operating element of the electrically operable brake, such as for example a threaded spindle or a threaded nut of a lifting gear of the electrically operable brake. The gear assembly comprises at least one gear stage which in turn comprises at least two intermeshing toothed wheels, at least one of which is rotatably mounted on an axle element, by the axle element engaging in a, for example, central socket of the at least one toothed wheel.

It is provided that the socket of the at least one toothed wheel and the axle element have mutually corresponding circumferential surfaces, at least one of which comprises an axially outwardly curved contour and the other of which comprises a contour with a form such that the circumferential surfaces roll relative to each other on the contours in order to bring the at least one toothed wheel and the axle element into an inclined position relative to each other, for example from a starting position.

Insert A certain freedom of movement is consequently afforded to the at least one toothed wheel and the associated axle element relative to each other such that a permanent or temporary inclined position of the axle element, for example due to components of the subassembly being deformed during operation, can be compensated. Possible changes in position of the at least one toothed wheel with respect to the position of its central axis can in this way be avoided or at least reduced to a minimum such that the engagement of the intermeshing teeth of the toothed wheels remains unchanged, or largely unchanged, during operation of the gear assembly. In this way, possible local excess loads in the region in which the intermeshing teeth engage and the concomitant production of noise are counteracted. Increased wear on components is also counteracted as a result and hence a long lifetime of the subassembly favored.

The term "roll" should in particular be understood to mean that one circumferential surface performs or can perform a rolling motion relative to the other circumferential surface. The contours provided for this purpose are formed correspondingly. The term "outwardly curved contour" should in particular be understood to mean a convexly arched contour. The description "outwardly curved" should in particular be understood to mean that the curvature is oriented in the direction of the central axis when the outwardly curved contour of the circumferential surface is associated with the socket, and that the curvature is oriented away from the central axis, i.e. for example radially outward, when the outwardly curved contour is associated with the circumferential surface of the at least one axle element. The term "axially" should in particular be understood to mean in the direction of the longitudinal axis of the socket and/or in the direction of the longitudinal axis of the axle element. The abovementioned inclined position can be a first inclined position. For example, the starting position is then not an inclined position but the longitudinal axis of the toothed wheel and the longitudinal axis of the axle element lie on a common axis. The inclined position can be a second, third, or other inclined position. The starting position is in this case already an inclined position.

In order to ensure the rolling of one outwardly curved contour relative to the other contour, according to an embodiment of the present disclosure the other contour, i.e. the contour of the other circumferential surface, can extend in a straight line or essentially in a straight line in the axial direction. As a result, it is possible to revert to existing toothed wheels or axle elements, the circumferential contour of which is usually linear in the axial direction. Cost advantages can consequently be obtained. It can alternatively be provided that the contour of the other circumferential surface is also outwardly curved in the axial direction. Rolling of the contours relative to each other is also enabled by this feature.

A pairing consisting of the at least one toothed wheel and the associated axle element can be formed as follows: the outwardly curved contour is associated with the circumferential surface of the socket, and the contour of the circumferential surface of the axle element extends in a straight line in the axial direction. Alternatively, the outwardly curved contour is associated with the circumferential surface of the axle element, and the contour of the circumferential surface of the socket extends in a straight line in the axial direction. Alternatively, both contours are in turn formed so that they are outwardly curved.

It is in particular provided that at least one of the contours is circumferential. Both contours can also in each be provided so that they are circumferential. The socket of the toothed wheel is formed, for example, with a round, in particular circular cross-section. The axle element is formed, for example, with a round, in particular circular cross-section. The socket is formed, for example, by a cylindrical hole, in particular a bore. The axle element can correspondingly have a cylindrical form. The toothed wheel with the socket can be produced in a technically simple manner if the socket forms a passage through the at least one toothed wheel, and the contour of the circumferential surface of the socket extends into the end region of at least one, preferably both openings of the passage.

According to one embodiment, it is provided that the at least one toothed wheel is a constituent part of a double or multiple toothed wheel which comprises at least one further toothed wheel by, for example, the at least one toothed wheel and the at least one further toothed wheel being provided on a common base body, in particular being integrally formed with the common base body or formed therefrom. The at least one further toothed wheel is, for example, associated with another of the gear stages of the gear assembly. A compact design of the gear assembly is consequently facilitated because the at least two toothed wheels are combined in a common component. It is in particular provided that the at least one toothed wheel and the at least one further toothed wheel are arranged so that they are arranged one behind the other in the axial direction, and the socket forms a passage through the toothed wheels in the axial direction.

It is recommended that at least one toothed wheel is a plastic part, in particular is made of plastic or comprises plastic. The at least one toothed wheel is, for example, an injection-molded part. The production of the at least one toothed wheel and the desired internal geometry of its socket is consequently made more technically advantageous.

It is moreover recommended that the at least one axle element is a metal part, in particular is made from metal or comprises metal. The possible appearance of wear in the rotatable connection between the axle element and the at least one toothed wheel is consequently counteracted. The axle element is, for example, a bearing pin or a bearing journal or another, preferably cylindrical connecting element which can be inserted into the socket of the at least one toothed wheel.

According to a further embodiment, it is provided that the at least one toothed wheel is a spur wheel. It is in particular provided that the at least one toothed wheel is a spur wheel with a reducing function in the at least one gear stage. The at least one gear stage is, for example, a spur wheel stage. As a result, an inclined position is permitted for the toothed wheel of the at least one gear stage in which the occurrence of possible undesired constraining forces during operation of the gear assembly is favorable because it has a larger diameter than the other toothed wheel of the at least one gear stage and hence a greater lever effect. It can in principle also be provided that the at least one gear stage is a planetary wheel stage and the at least one toothed wheel is a sun wheel or at least one planetary wheel of the planetary wheel stage.

A further embodiment consists in the at least one axle element being held on a support structure and/or a housing. The axle element can be fastened rotatably or fixed in rotation on the support structure or the housing, for example can be inserted into a hole of the support structure or a hole of the housing. Where multiple axle elements are provided, individual or all the axle elements can be arranged on the support structure and/or the housing.

It can moreover be provided that the support structure is arranged loosely in the housing and/or is supported against the housing. Rubber elastic or other elastic elements, for example damping elements, are, for example, provided for the purpose of support in order to prevent or at least reduce the transmission of force and/or noise. Alternatively, the support structure can also be fastened against the housing in order to at least partially divert excess loads which occur during operation from the support structure into the housing. For example, the support structure comprises a support plate or consists of a support plate or another plate-like component.

According to another aspect of the present disclosure, a geared motor for an electrically operable brake is provided. The geared motor comprises an engine and the abovedescribed gear assembly, which is or can be actively connected to the engine. The engine is, for example, an electromotor. The geared motor is in principle suitable for use in connection with a parking brake and/or a service brake.

According to another aspect of the present disclosure, a parking brake system for a motor vehicle is provided. The parking brake system comprises the abovedescribed geared motor which serves to operate at least one brake shoe. The parking brake system moreover comprises an electronic control device for controlling the geared motor, wherein the control device and the engine are configured so as to adjust, in particular steplessly adjust, a parking brake force exerted by the at least one brake shoe according to one or more preset values in order to perform a parking brake action. Information on the inclination of the road and/or the coefficient of friction of the road surface and/or on the current driving or stationary state of the motor vehicle and/or on parameters of the motor vehicle such as, for example, the loading conditions is, for example, included or used as a basis in the preset values. Controlled adjustment of the parking brake force exerted by the at least one associated brake shoe is thus enabled and a regulated application of braking force can be performed, for example to allow the motor vehicle to move away comfortably, in particular on an inclined road.

The term "parking brake action" should in particular be understood to mean a function of the parking brake system by means of which a vehicle equipped with the parking brake system is maintained stationary, in particular in the absence of the driver, when a parking brake action is performed. It is intended thereby to prevent the motor vehicle from rolling away inadvertently even though the motor vehicle is on an inclined road. The process of parking brake action is also called parking braking.

According to yet another aspect of the present disclosure, a service brake system for a motor vehicle is provided. The service brake system comprises the abovedescribed geared motor which serves to operate at least one brake shoe. The service brake system moreover comprises an electronic control device for controlling the geared motor, wherein the control device and the engine are configured so as to adjust, in particular steplessly adjust, a braking force exerted by the at least one brake shoe according to one or more preset values in order to perform a service brake action. Information on the braking request made by the driver, a driver assistance system, or an independent driving system, and/or the inclination of the road and/or the coefficient of friction of the road surface and/or on the current driving, deceleration, or acceleration state of the motor vehicle and/or on parameters of the motor vehicle such as, for example, the loading conditions is, for example, included or used as a basis in the preset values. Controlled adjustment of the braking force exerted by the at least one associated brake shoe is thus enabled and a regulated application of braking force can be performed, for example to allow the motor vehicle to slow down comfortably.

The term "service brake action" should in particular be understood to mean a function of the service brake system by means of which the driver, a driver assistance system, or an independent driving system are enabled to reduce the speed of a motor vehicle equipped with the service brake system during its operation or to bring the motor vehicle to a stop.

BRIEF DESCRIPTION OF THE DRAWINGS

Further details and features of the present disclosure can be found in the following description of multiple exemplary embodiments with the aid of the drawings, in which.

DETAILED DESCRIPTION

Figure 1:
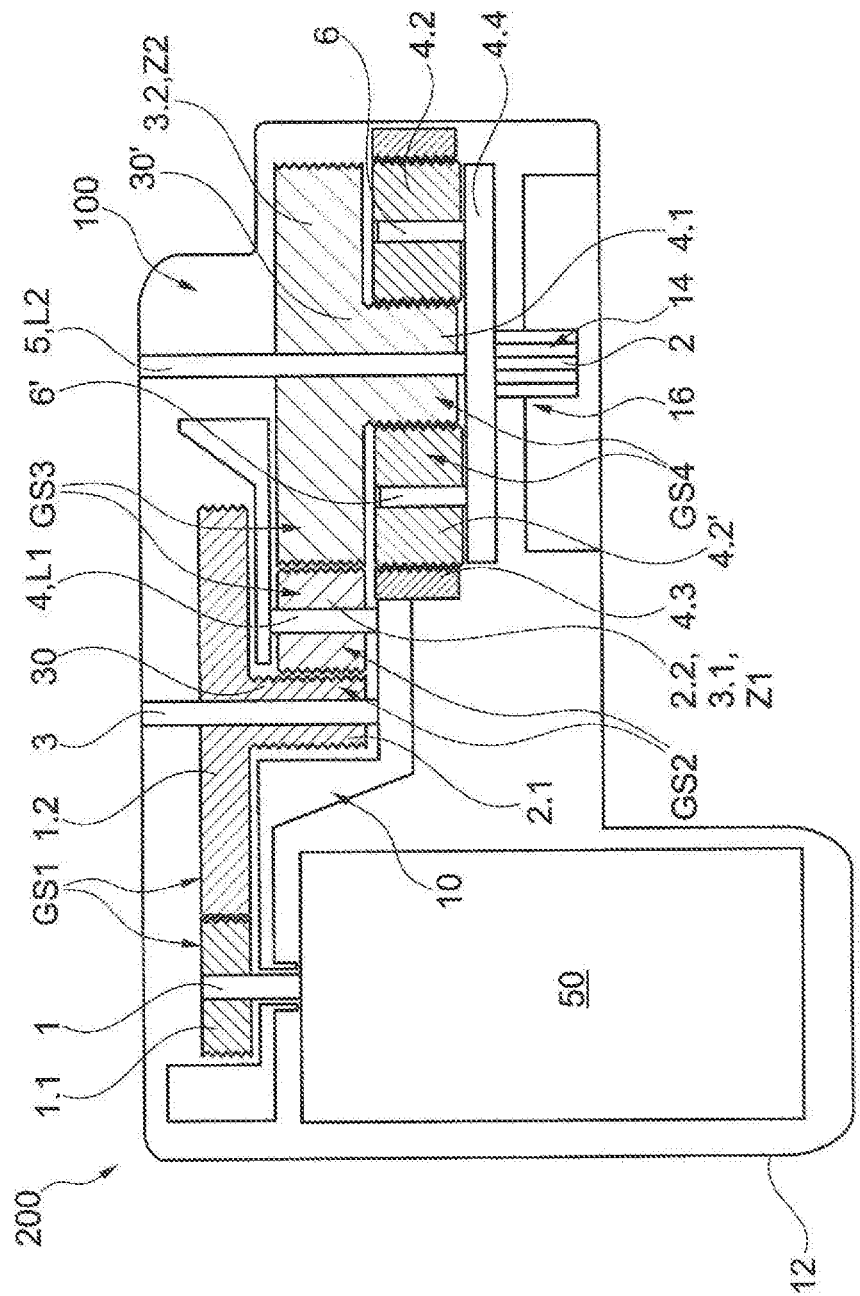
FIG. 1 shows a possible embodiment of a geared motor in a schematic

FIG. 1 shows a possible embodiment of a geared motor 200 which can be used, for example, in order to operate an electric parking brake (EPB) and/or an electromechanical service brake (EMB) of a motor vehicle. The geared motor 200 comprises an engine 50 which is, for example, an electromotor. The geared motor 200 moreover comprises a gear assembly 100. The engine 50 and the gear assembly 100 are preferably arranged in a housing 12, in particular a common housing.

The gear assembly 100 is actively connected on the input side to the engine 50. For this purpose, the gear assembly 100 preferably has a gearbox input shaft 1 which is coupled in driving fashion, in particular is connected so that it is fixed in rotation, to the driven shaft of the engine 50. The gearbox input shaft 1 can also be formed by the driven shaft of the engine 50. The gear assembly 100 moreover has a gearbox output shaft 2 which can be coupled to the parking brake and/or the service brake, for example to a lifting gear of the parking brake and/or the service brake. For this purpose, the gearbox output shaft 2 is preferably coupled, in particular is connected so that it is fixed in rotation, for exam pie, at one end to a toothed wheel 14 or another transmission element, or the toothed wheel 14 or the other transmission element is integrally formed on the gearbox output shaft 2. One end preferably projects with the toothed wheel 14 from the housing 12, and a flange 16 is preferably provided, in particular formed, on the housing 12 in the region around the toothed wheel 14.

The gear assembly 100 furthermore comprises at least one, preferably multiple gear stages GS1, GS2, GS3, GS4, in particular a first gear stage GS1, a second gear stage GS2, a third gear stage GS3, and a fourth gear stage GS4. Viewed in the direction of the flow of force and starting from the engine 50, the gear stages GS1, GS2, GS3, GS4 are preferably arranged in the order first gear stage GS1, second gear stage GS2, third gear stage GS3, fourth gear stage GS4. The first gear stage GS1, the second gear stage GS2, and the third gear stage GS3 are preferably in each case spur wheel stages with in each case at least two intermeshing toothed wheels 1.1, 1.2 or 2.1, 2.2 or 3.1, 3.2, in particular a first toothed wheel 1.1 and a second toothed wheel 1.2 of the first gear stage GS1, a first toothed wheel 2.1 and a second toothed wheel 2.2 of the second gear stage GS2, and a first toothed wheel 3.1 and a second toothed wheel 3.2 of the third gear stage GS3. The fourth gear stage GS4 is preferably a planetary wheel stage with at least two toothed wheels 4.1, 4.2, a first toothed wheel 4.1 of which is a sun wheel, and a second toothed wheel 4.2 of which is a planetary wheel meshing with the sun wheel, for example. At least one further second toothed wheel 4.2' is preferably provided which is a planetary wheel. A third toothed wheel 4.3 is moreover provided which is formed as a hollow wheel with internal teeth. The third toothed wheel 4.3 meshes with the at least one second toothed wheel 4.2 or 4.2' via the internal teeth.

With respect to the first gear stage GS1, the first toothed wheel 1.1 is connected to the gearbox input shaft 1 so that it is fixed in rotation and the second toothed wheel 1.2 is rotatably mounted on a first axle element 3. With respect to the second gear stage GS2, the first toothed wheel 2.1 is likewise rotatably mounted on the first axle element 3 and the second toothed wheel 2.2 is rotatably mounted on a second axle element 4. With respect to the third gear stage GS3, the first toothed wheel 3.1 is likewise rotatably mounted on the second axle element 4 and the second toothed wheel 3.2 is rotatably mounted on a third axle element 5. The first axle element 3 and/or the second axle element 4 and/or the third axle element 5 are fastened or retained on a support structure 10, in particular a common support structure 10, and/or on the housing 12, in particular is inserted removably into insertion sockets. The support structure 10 can have a plate-shaped design or at least have a pate-shaped section. The support structure 10 is, for example, arranged loosely in the housing 12 and/or is supported against the housing 12. The support structure 10 is, for example, a plastic part which consists of a plastic material or comprises a plastic material.

In order to transmit the flow of force from the first gear stage GS1 to the second gear stage GS2, the second toothed wheel 1.2 of the first gear stage GS1 and the first toothed wheel 2.1 of the second gear stage GS2 are connected to each other so that they are fixed in rotation or are formed, in particular shaped, as a double toothed wheel from a common base body 30. In order to transmit the flow of force from the second gear stage GS2 to the third gear stage GS3, a single toothed wheel is provided for the gear assembly 100 and performs the function of the second toothed wheel 2.2 of the second gear stage GS2 and likewise the function of the first toothed wheel 3.1 of the third gear stage GS3. This toothed wheel is an intermediate wheel and serves, for example, to stabilize the gear assembly 100 during the force transfer. In order to transmit the flow of force from the third gear stage GS3 to the fourth gear stage GS4, the second toothed wheel 3.2 of the third gear stage GS3 and the first toothed wheel 4.1 of the fourth gear stage GS4 are preferably connected to each other so that they are fixed in rotation or formed, in particular shaped, as a double toothed wheel from a common base body 30'.

With respect to the fourth gear stage GS4, the at least one second toothed wheel 4.2 or 4.2' is rotatably mounted on an associated fourth axle element 6 or 6'. The at least one fourth axle element 6 or 6' is preferably fastened or retained on a planetary wheel support 4.4 of the fourth gear stage GS4, in particular is inserted removably in an insertion socket. In order to transmit the flow of force from the fourth gear stage GS4 to the gearbox output shaft 2 or the toothed wheel 14, the planetary wheel support 4.4 is connected to the gearbox output shaft 2 or the toothed wheel 14 so that it is fixed in rotation or is integrally formed therewith. It is preferably moreover provided that the third toothed wheel 4.3 formed as a hollow wheel is fixed against the housing 12 and/or the support structure 10, in particular is integrally formed with the support structure 10 and/or the housing 12.

Figure 2:
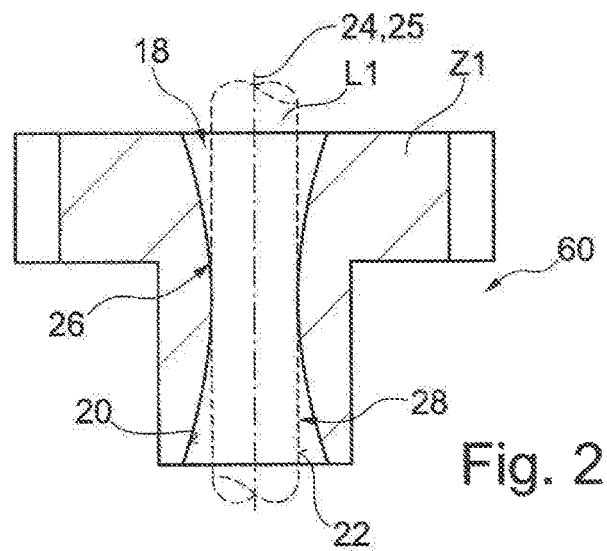
FIG. 2 shows a possible embodiment of a toothed wheel/axle pair with an axle element and a toothed wheel rotatably mounted thereon in a view in cross-section.

FIG. 2 shows a possible embodiment of a toothed wheel/axle pair 60 with an axle element L1 and a toothed wheel Z1 mounted rotatably thereon in a view in cross-section. The axle element L1 can be at least one of the abovedescribed axle elements of the gear assembly 100, for example the first axle element 3 and/or the second axle element 4 and/or the third axle element 5 and/or the fourth axle element 6 or 6'. In this respect, the toothed wheel Z1 can be the second toothed wheel 1.2 of the first gear stage GS1 and/or the first toothed wheel 2.1 of the second gear stage GS2 and/or the first toothed wheel 3.1 of the third gear stage GS3 and/or the second toothed wheel 3.2 of the third gear stage GS3 and/or the first toothed wheel 4.1 of the fourth gear stage GS4 and/or the at least one second toothed wheel 4.2 or 4.2' of the fourth gear stage GS4.

As can be seen in FIG. 2, the toothed wheel Z1 has a socket 18 into which the axle element L1 engages. The socket 18 is, for example, a hole or throughhole, in particular a bore or through-bore. The socket 18 is formed with a preferably round, in particular circular cross-section. The axle element L1 is formed with a preferably corresponding round, in particular circular cross-section. The axle element L1 is, for example, a journal element or a pin element which is formed in particular with a cylindrical shape.

It is preferably provided that the socket 18 comprises a circumferential surface 20 and the axle element L1 comprises a circumferential surface 22 corresponding to the circumferential surface 20. It is preferably moreover provided that, in the direction of the longitudinal axis 24 of the socket 18, the circumferential surface 20 comprises an outwardly curved contour 26 and, in the direction of the longitudinal axis 25 of the axle element L1, the circumferential surface 22 comprises a contour 28 which is formed in such a way that the circumferential surfaces 20, 22 roll against each other on the contours 26, 28 in order to bring the toothed wheel Z1 and the axle element L1 into an inclined position relative to each other. In FIG. 2, the axle element L1 and the toothed wheel Z1 are arranged in a starting position with respect to each other. In the starting position, the longitudinal axis 24 of the socket 18 and the longitudinal axis 25 of the toothed wheel Z1 preferably lie on a common axis. In FIG. 2, the contour 28 of the circumferential surface 22 of the axle element L1 is formed so that it extends in a straight line in the axial direction. The axle element L1 has, for example, a diameter which remains the same or essentially the same in the direction of its longitudinal axis 25.

By virtue of the contours 26, 28 of the circumferential surfaces 20, 22, the toothed wheel Z1 and the associated axle element L1 have a certain freedom of movement relative to each other such that a permanent or temporary inclined position of the axle element L1 can be compensated without the position of the toothed wheel Z1 changing or at least changing only slightly. In this way it is ensured that, in the event of changes in position of the axle element L1, the region in which the teeth of the toothed wheel Z1 and another toothed wheel (not shown in FIG. 2) with which it meshes engage remains unchanged.

Figure 3:
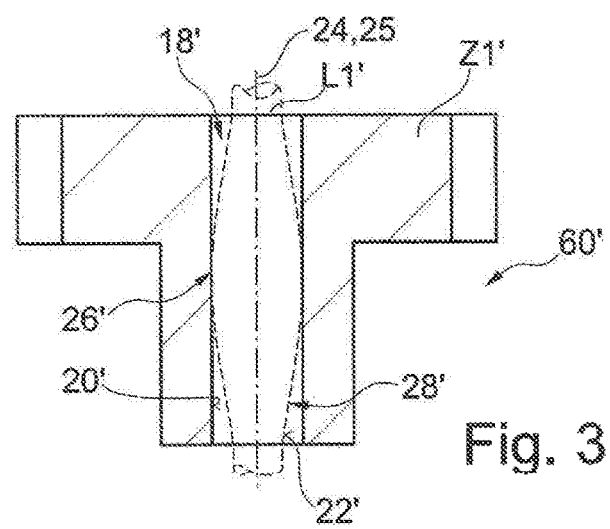
FIG. 3 shows a further embodiment of a toothed wheel/axle pair with an axle element and a toothed wheel rotatably mounted thereon in a view in cross-section.

FIG. 3 shows a further embodiment of a toothed wheel/axle pair 60'' in a view in cross-section. The toothed wheel/axle pair 60' in FIG. 3 differs from the toothed wheel/axle pair 60 in FIG. 2 inter alia in that an axle element L1' is provided which has a circumferential surface 22' which has an outwardly curved contour 28' in the axial direction, and in that a toothed wheel Z1' is provided which has a circumferential surface 20' which has a contour 26' which extends in a straight line or essentially a straight line in the axial direction. The socket 18' of the toothed wheel Z1' is formed, for example, by a bore or through bore with a cross-section which remains the same or essentially the same in the axial direction. In contrast, the circumferential surface 22' of the axle element L1' is formed by the outwardly curved contour 28' of the axle element L1' owing to a convex external geometry.

Figure 4:
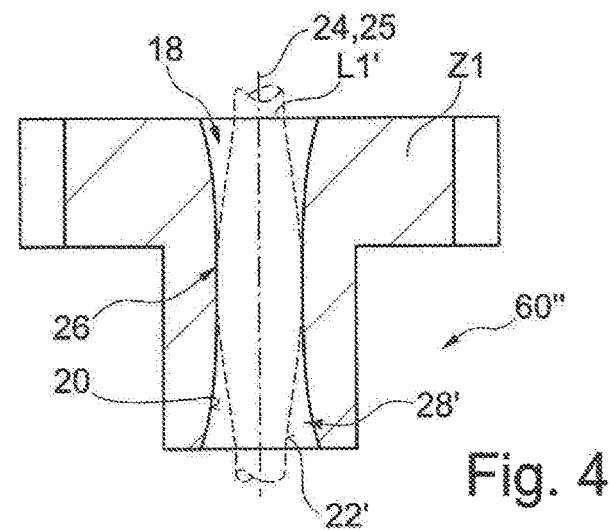
FIG. 4 shows yet another embodiment of a toothed wheel/axle pair with an axle element and a toothed wheel rotatably mounted thereon in a view in cross-section.

FIG. 4 shows yet another possible embodiment of a toothed wheel/axle pair 60' in a view in cross-section. The toothed wheel/axle pair 60'' is a combination of the toothed wheel/axle pairs 60 in FIG. 1 and the toothed wheel/axle pair 60' in FIG. 3 with respect to the outwardly curved contours. The toothed wheel/axle pair 60'' has the toothed wheel Z1 in FIG. 2 and the axle element L1' in FIG. 3. In this respect, both the axle element L1' and the toothed wheel Z1 are formed by an outwardly curved contour.

Figure 5:
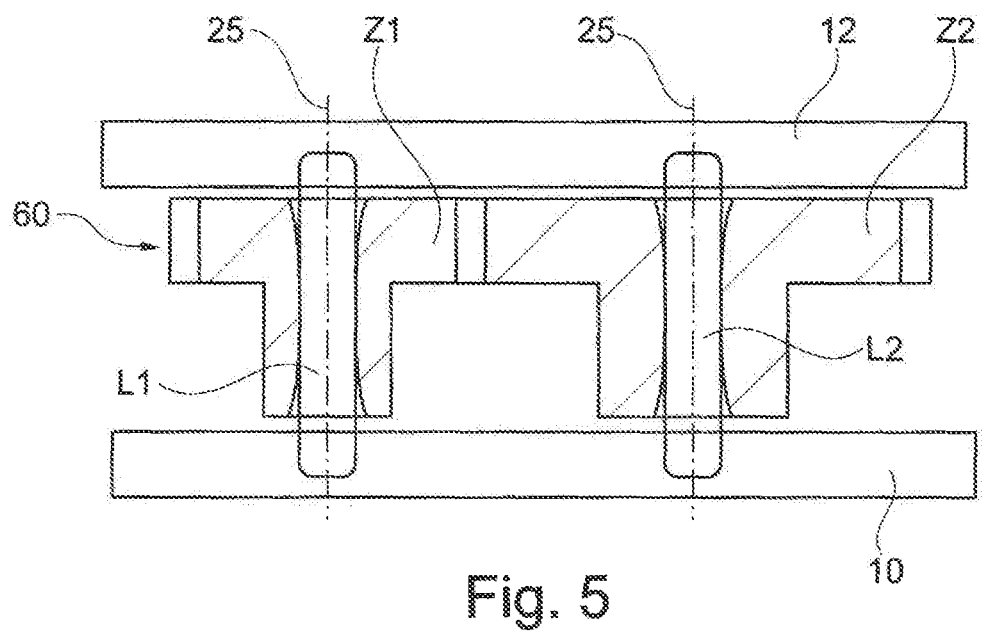
FIG. 5 shows two intermeshing toothed wheels and two associated axle elements in the toothed wheel/axle pair in FIG. 2, wherein the axle elements are supported on the one hand on a support structure and on the other hand on a housing, in an unloaded state of the support structure.

FIG. 5 shows, by way of example, an arrangement of the toothed wheel/axle pair 60 in FIG. 2 with a further toothed wheel/axle pair which can be constructed in the same way as the toothed wheel/axle pair 60. The toothed wheel Z1 of the toothed wheel/axle pair 60 meshes with a toothed wheel Z2 of the other toothed wheel/axle pair, wherein the axle element L1 of the toothed wheel/axle pair 60 is supported on the one hand against a support structure and on the other hand against a housing, or in each case is retained therein. The support structure can be the support structure 10 of the gear assembly 100 in FIG. 1. The housing can likewise be the housing 12 of the gear assembly 100 in FIG. 1. In the case of the toothed wheel Z2, an associated axle element L2 is supported on the one hand on the support structure 10 and on the other hand on the housing 12, in particular is retained thereon.

Figure 6:
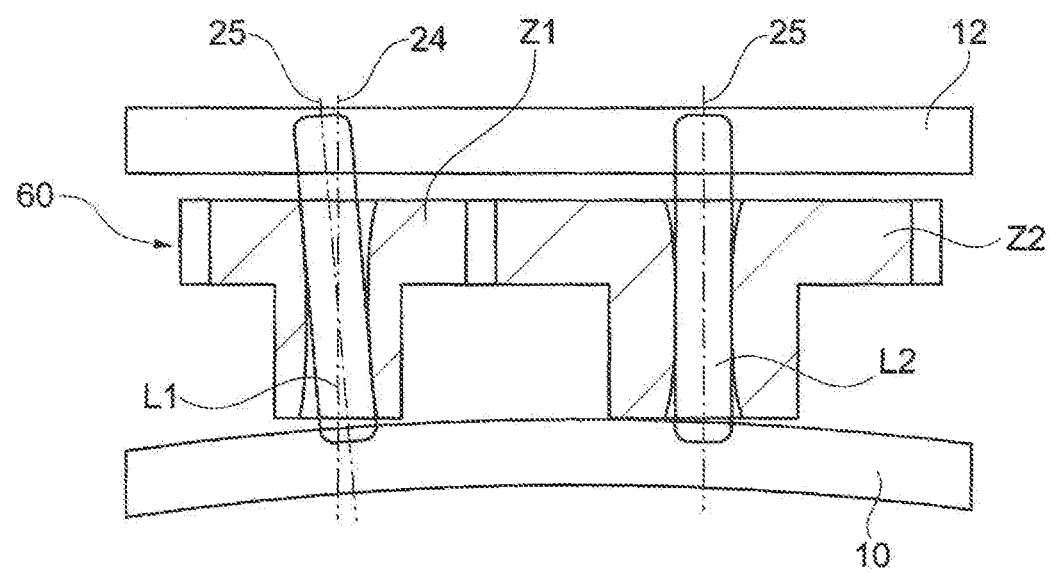
FIG. 6 shows the arrangement in FIG. 5 in a loaded state of the support structure.

FIG. 5 shows the arrangement in an unloaded state. Such an unloaded state prevails, for example, when the gear assembly 100 or the geared motor 200 is switched off and in this respect no or only minor forces need to be transmitted. In the eventuality that force is then transmitted via the subassembly 100 or by the geared motor 200, it can occur that, for example, the support structure 10 and/or the housing 12 are deformed. FIG. 6 shows such a state in which at least the support structure 10 has been deformed slightly, for example bulged outward in a direction, as a result of which the position of the axle elements L1 and L2 relative to each other has changed. By virtue of the provided contours 26 and 28 on the mutually corresponding circumferential surfaces 20 and 22 of the socket 18 on the toothed wheel Z1 and the outer circumference of the axle element L1 and similarly with respect to the toothed wheel Z2 and the axle element L2, such deformation is allowed for the whole system without the position of the intermeshing toothed wheels Z1 and Z2 consequently changing in terms of their position relative to each other. The region in which the intermeshing teeth of the toothed wheel Z1 and the toothed wheel Z2 engage therefore in this way remains unchanged.

In the present description, reference to a specific aspect or a specific embodiment or a specific design means that a specific feature or a specific property is described in connection with the respective aspect or the respective embodiment or the respective design, at least is included therein, but does not necessarily need to be included in all aspects or embodiments or designs of the present disclosure. It is expressly noted that all combinations of the different features and/or structures and/or properties which are described with reference to the present disclosure are comprised by the present disclosure, as long as this is not contradicted expressly or explicitly by the context.

The use of individual or all examples or wording used by way of example in the text is intended only to illustrate the present disclosure and represents no limitation with regard to the scope of the present disclosure, unless otherwise claimed. Also, no wording or formulation in the description should be understood to mean that it is an element which is not claimed but is essential for the application of the present disclosure.

The invention claimed is:

1. A gear assembly for a geared motor of an electrically operable brake, wherein the gear assembly can be actively connected on the input side to an engine and on the output side to an operating element of the electrically operable brake, and comprises at least one gear stage, the gear assembly being supported in a housing, wherein the at least one gear stage comprises at least two intermeshing toothed wheels, at least one toothed wheel of which is rotatably mounted on an axle element, by the axle element engaging in a socket of the at least one toothed wheel, the axle element being retained on at least one of the housing and a support structure in the housing, wherein the socket and the axle element have mutually corresponding circumferential surfaces, at least one circumferential surface of which comprises an axially outwardly curved contour and the other circumferential surface of which comprises a contour with a form such that the circumferential surfaces roll relative to each other on the contours in order to bring the at least one toothed wheel and the axle element into an inclined position relative to each other when the at least one of the housing and the support structure on which the axle element is retained is deformed.

2. The gear assembly as claimed in claim 1, wherein the contour of the other circumferential surface extends in a straight line in the axial direction.

3. The gear assembly as claimed in claim 1, wherein the contour of the other circumferential surface is curved outward in the axial direction.

4. The gear assembly as claimed in claim 3, wherein it is provided that at least one of the contours is circumferential.

5. The gear assembly as claimed in claim 4, wherein the socket forms a passage through the at least one toothed wheel, and the contour of the circumferential surface of the socket extends into at least one end region of the passage.

6. The gear assembly as claimed in claim 5, wherein the at least one toothed wheel is a constituent part of a double or multiple toothed wheel which comprises at least one further toothed wheel, wherein the at least one toothed wheel and the at least one further toothed wheel are provided on a common base body.

7. The gear assembly as claimed in claim 6, wherein the at least one toothed wheel is a spur wheel.

8. The gear assembly as claimed in claim 7, wherein the at least one gear stage is a planetary wheel stage and the at least one toothed wheel is a sun wheel or at least one planetary wheel of the planetary wheel stage.

9. The gear assembly as claimed in claim 8, wherein the at least one axle element is retained on the support structure and the housing.

10. The gear assembly as claimed in claim 1, wherein the at least one gear stage is a spur wheel stage.

11. The gear assembly as claimed in claim 1, wherein the support structure is arranged loosely in the housing and is supported against the housing.

12. The gear assembly as claimed in claim 1, wherein the support structure is fastened against the housing.

13. The gear assembly as claimed in claim 1, wherein the two intermeshing toothed wheels include first and second toothed wheels, the first toothed wheel being rotatably mounted on the axle element, the axle element being retained on the support structure, the second toothed wheel being rotatably mounted on a second axle element, the second axle element engaging in a second socket of the second toothed wheel, the second axle element being retained on the a second support structure in the housing, the second socket and the second axle element having mutually corresponding circumferential surfaces, at least one circumferential surface of the second socket and second axle element comprising an axially outwardly curved contour and the other circumferential surface of the second socket and second axle element comprising a contour with a form such that the circumferential surfaces roll relative to each other on the contours in order to bring the second toothed wheel and the second axle element into an inclined position relative to each other when at least one of the housing and the second support structure is deformed.

14. The gear assembly as claimed in claim 1, wherein at least one of the housing and the support structure has a curved configuration when deformed.

15. A gear assembly for a geared motor of an electrically operable brake, wherein the gear assembly can be actively connected on the input side to an engine and on the output side to an operating element of the electrically operable brake, and comprises at least one gear stage, the at least one gear stage being a planetary wheel stage and comprising at least two intermeshing toothed wheels, at least one of the toothed wheels being a sun wheel of the planetary wheel stage, the sun wheel being a spur wheel, the sun wheel being rotatably mounted on an axle element, by the axle element engaging in a socket of the sun wheel, the axle element being retained on at least one of a support structure and a housing, the support structure being fastened against the housing, wherein the socket and the axle element have mutually corresponding circumferential surfaces, at least one circumferential surface of which comprises an axially outwardly curved contour and the other circumferential surface of which comprises a contour with a form such that the circumferential surfaces roll relative to each other on the contours in order to bring the sun wheel and the axle element into an inclined position relative to each other.

16. The gear assembly as claimed in claim 15, wherein the contour of the other circumferential surface extends in a straight line in the axial direction.

17. The gear assembly as claimed in claim 15, wherein the contour of the other circumferential surface is curved outward in the axial direction.

18. The gear assembly as claimed in claim 15, wherein the sun wheel is a constituent part of a double or multiple toothed wheel which comprises at least one further toothed wheel, wherein the sun wheel and the at least one further toothed wheel are provided on a common base body.

\* \* \* \* \*